(12) United States Patent
Dottax et al.

(10) Patent No.: US 8,199,909 B2
(45) Date of Patent: Jun. 12, 2012

(54) METHOD AND DEVICE FOR CARRYING OUT A CRYPTOGRAPHIC CALCULATION

(75) Inventors: Emmanuelle Dottax, Conflans Sainte Honorine (FR); Hervé Chabanne, Mantes la Jolie (FR); Vincent Carlier, Orsay (FR)

(73) Assignee: Morpho, Paris (FR)

( * ) Notice: Subject to any disclaimer, the term of this patent is extended or adjusted under 35 U.S.C. 154(b) by 1103 days.

(21) Appl. No.: 11/569,704

(22) PCT Filed: Jun. 6, 2005

(86) PCT No.: PCT/FR2005/001376
§ 371 (c)(1),
(2), (4) Date: Jun. 8, 2007

(87) PCT Pub. No.: WO2006/008355
PCT Pub. Date: Jan. 26, 2006

(65) Prior Publication Data
US 2008/0253557 A1    Oct. 16, 2008

(30) Foreign Application Priority Data
Jun. 18, 2004    (FR) .................................... 04 06678

(51) Int. Cl.
H04L 29/06    (2006.01)
(52) U.S. Cl. ........................................................ 380/28
(58) Field of Classification Search .................... 380/28
See application file for complete search history.

(56) References Cited

U.S. PATENT DOCUMENTS
2002/0034295 A1 *    3/2002    Den Boer .................... 380/37

FOREIGN PATENT DOCUMENTS
WO    WO 2004 070510    8/2004

OTHER PUBLICATIONS

Elisabeth Oswald, Stefan Mangard and Norbert Pramstaller, *Secure and Efficient Masking of AES—A Mission Impossible?*, Technical University Graz, Institute for Applied Information Processing and Communications, Version 1 0, SCA-Lab Technical Report Series, IAIK—TR Nov. 1, 2003 (updated on Jun. 4, 2004).

(Continued)

*Primary Examiner* — Nasser Goodarzi
*Assistant Examiner* — Lisa Lewis
(74) *Attorney, Agent, or Firm* — Miller, Matthias & Hull LLP

(57) ABSTRACT

A cryptographic calculation is carried out in an electronic component according to a specific cryptographic algorithm including at least one specified non-linear operation on blocks of data of k bits, k being a whole number of more than 2. Several blocks of masked intermediate data of j bits are generated from an initial block of data of k bits, j being a whole number that is smaller than k. Then a non-linear operation S is applied to at least one of the masked intermediate data blocks of j bits with the aid of a substitution table with 2 inputs producing a modified data block of j bits. The modified data block of j bits and at least some of the masked intermediate data blocks of j bits are combined to form a result block of k bits corresponding to the initial data block of k bits by means of a transformation including the specified non linear operation.

19 Claims, 2 Drawing Sheets

OTHER PUBLICATIONS

Tsung-Fu Lin, Chih-Pin Su, Chih-Tsun Huang, and Cheng-Wen Wu, *A High-Throughput Low-Cost AES Cipher Chip*, Laboratory for Reliable Computing, Department of Electrical Engineering, National Tsing Hua University Hsinchu, Taiwan 30013, R O C (Aug. 6, 2002).

Oswald, et al.; Secure and Efficient Masking of AES—A Mission Impossible?; SCA-Lab Technical Report Series; Version 1.0; Jun. 4, 2004; p. 1, line 1; p. 15, line 12; Graz Austria.

Tsung, et al.; A High-Throughput Low-Cost AES Cipher Chip; 2002 IEEE Asia-Pacific Conference on ASIC Proceedings; Oct. 8, 2002; pp. 85-88; Piscataway, NJ, USA.

Wolkerstorfer, et al.; An ASIC Implementation of the AES SBoxes; vol. 2271; pp. 67-78; Springer-Verlag, Berlin Heidelberg 2002.

Akkar M-L, et al; An implementation of DES and AES, Secure Against Some Attacks; pp. 309-318; Springer-Verlag Berlin Heidelberg 2001.

Goubin, et al.; DES and Differential Power Analysis The "Duplication" Method*; Bull SmartCards and Terminals.

Blömer, et al.; Provably Secure Masking of AES; Paderborn University; Infineon Technologies Secure Mobile Solutions.

* cited by examiner

METHOD AND DEVICE FOR CARRYING OUT A CRYPTOGRAPHIC CALCULATION

CROSS-REFERENCE TO RELATED APPLICATION

This is the U.S. National Phase of International Application No. PCT/FR2005/01376 filed 6 Jun. 2005, the entire disclosure of which is incorporated herein by reference.

FIELD OF THE DISCLOSURE

The present invention pertains to the area of cryptography and more particularly to the protection of the confidentiality of the keys used by cryptographic algorithms. It is described hereinbelow in its nonlimiting application to encryption or decryption functions.

BACKGROUND OF THE DISCLOSURE

Algorithms for encryption, respectively for decryption, or again for enciphering, are aimed at encrypting, respectively decrypting, data Such algorithms generally comprise a chaining together of several operations, or calculations, that are applied successively to a data item to be encrypted so as to obtain an encrypted data item. These algorithms use secret keys.

Such encryption algorithms may suffer from "attacks" which are aimed at violating the confidentiality of keys used. Numerous types of attacks are known today.

Thus, certain attacks are based on information leaks detected during the execution of the encryption algorithm. These attacks are generally founded on a correlation between the information leaks detected during the processing by the encryption algorithm of the data item and of the key or keys (attacks by analyzing the consumption of current, electromagnetic emanations, calculation time, etc).

Procedures for protecting against such attacks are known. One of the protection procedures commonly used is the random masking of the intermediate data manipulated by the encryption or decryption algorithm. In this type of protection, the input data are masked by random values. Thus, the intermediate data resulting from the operations performed in the algorithm may be decorrelated from the key or keys.

The attacks which are aimed at violating the confidentiality of the secret keys of an encryption algorithm are similar to the attacks aimed at violating the confidentiality of the secret keys of a decryption algorithm. In the following sections the characteristics described in relation to an encryption algorithm also relate to a decryption algorithm.

An encryption algorithm generally comprises several linear and/or nonlinear operations. For an initial data item to be encrypted, an intermediate data item is obtained after each of the operations of the encryption algorithm. When masked intermediate data are manipulated, a masked intermediate data item is obtained after each operation. The encryption algorithm is thus protected.

It is however useful to recover the unmasked intermediate data item after each of these operations by "demasking" the data item. It is easy to demask an intermediate data item resulting from a linear operation. Specifically, a linear operation L applied to a data item x masked by an exclusive or with a random mask m, may be written in the form:

$$L(x \oplus m) = L(x) \oplus L(m).$$

Thus, knowing m, it is easy to demask $L(x \oplus m)$ to obtain $L(x)$.

It is entirely otherwise fox nonlinear operations. Specifically, for a nonlinear operation F applied to a data item x masked by an exclusive or with a random mask m, it is generally possible to write:

$$F(x \oplus m) \neq F(x) \oplus F(m).$$

In order to demask an intermediate data item manipulated by the encryption algorithm, it is necessary to perform a series of calculations which may be complex and expensive depending on the encryption algorithm to be protected.

Encryption algorithms are known that use nonlinear operations, such as the DES ("data encryption standard") algorithm or else the AES ("advanced encryption standard") algorithm. Several methods of protection by masking of the AES algorithm have already been proposed.

In such algorithms, the nonlinear operations are generally implemented in the form of substitution tables. Thus, a nonlinear operation corresponding to a substitution table tab[i], applied to a data item x may be written in the following form:

$$y = \text{tab}[x].$$

The protection by masking in this case requires the generation on the fly of the randomly masked tables. Thus, a masked nonlinear operation corresponding to a masked substitution table tab'[i], applied to a data item x masked by a random mask m1 may be written in the form:

$$y' = \text{tab}'[x \oplus m1] = y \oplus m2$$

In order to be able to demask the data item y' thus obtained, a solution consists in storing the masked tables. Protection procedures of this type are proposed for the DES encryption algorithm in the document by Louis Goubin and Jacques Patarin 'DES and Differential Power Analysis—The "Duplication" Method', in Cetin Kaya Koç and Christof Paar, editors, Proceedings of CHES '99, volume 1717 of 'Lecture Notes in Computer Science', pages 158-172, Springer-Verlag, 2000, as well as in patent FR 2802741 'Dispositif mettant en oeuvre un algorithme de chiffrage par bloc à répétition de rondes' [device implementing a blockwise encryption algorithm with repetition of rounds].

However, such a solution may turn out to be extremely expensive in terms of memory room, in particular when the unmasked substitution table is of relatively large size.

For example, the nonlinear operation of the AES may be implemented using a substitution table having a size of 256 bytes. The simultaneous encryption of 16 bytes of a message requires the storage of 16 masked substitution tables each of 256 bytes. The memory size required to mask the nonlinear operation thus implemented is consequently 4 Kb.

A drawback of this type of protection is therefore that it requires a consequential memory size.

Also known is the document 'Provably Secure Masking of AES' by Johannes Blömer, Guarjardo Merchan, and Volker Krummel published on Apr. 30, 2004 and the document 'Secure and Efficient Masking of AES—A Mission Impossible' version 1 of E. Oswald, Stephan Mangard and Norbert Pramstaller dated from 4 Jun. 2004 which propose that the nonlinear operation of the AES algorithm be carried out in the finite field GF(4).

The latter article proposes a procedure for masking the operations of the AES algorithm in which the nonlinear operation of an intermediate masked data item is transformed into a linear operation by transposition from one finite field $(GF(2^8))$ to another $(GF(4))$.

However, such a method of masking of the AES proposes that the nonlinear operations be carried out in GF(4) and hence that bits be manipulated 2 by 2.

In general, it is easier to efficaciously implement operations carried out on blocks of bits of size substantially equal to the number of bits processed simultaneously by the microprocessor used rather than operations carried out on blocks of bits of size very substantially different from the number of bits processed simultaneously by the microprocessor.

Thus, an efficacious implementation of an encryption algorithm manipulating bits 2 by 2 is not easy on 8, 16, 32 or even 64-bit microprocessors.

SUMMARY OF THE DISCLOSURE

The present invention is aimed at proposing a solution to alleviate these drawbacks.

A first aspect of the invention proposes a method of executing a cryptographic calculation in an electronic component, according to a determined cryptographic algorithm including at least one nonlinear operation specified on data blocks of k bits, k being an integer greater than 2, the method comprising the following steps:

generating several masked intermediate data blocks of j bits from an initial data block of k bits, j being an integer smaller than k;

applying a nonlinear operation to at least one of the masked intermediate data blocks of j bits by means of a substitution table with $2^j$ entries producing a modified data block of j bits;

combining the modified data block of j bits and certain at least of said masked intermediate data blocks of j bits into a result block of k bits corresponding to the initial data block of k bits through a transformation including said specified nonlinear operation.

Thus, it is possible to carry out the nonlinear operation specified on data blocks of size k on data blocks of size j by generating several intermediate data blocks of size j, the sizes being expressed in bits, from a data block of size k. After having manipulated the intermediate data blocks, and in particular applying a nonlinear operation, data blocks thus obtained are combined to recover a data block of size k corresponding to a transformation of the initial data block. This transformation includes the specified nonlinear operation. It may also include other operations of the algorithm. Specifically, it may be advantageous to carry out other operations of the algorithm on data blocks of j bits rather than data blocks of k bits, before combining these blocks to again obtain a data block of k bits.

The step of generating several intermediate data blocks from an initial data block may comprise several steps, as detailed in the following sections. Thus, advantageously data blocks of smaller size than the initial data block to be encrypted by the algorithm are manipulated. Consequently the nonlinear operation specified, included in the encryption algorithm may be applied to the intermediate data blocks of smaller size and therefore the substitution table corresponding to the nonlinear operation applied to the intermediate data blocks is of strictly smaller size than the size of a substitution table which would correspond to the specified nonlinear operation of the algorithm applied to the initial data block.

By virtue of these provisions, it is possible to protect by masking the cryptographic calculations of an encryption algorithm which comprises a nonlinear operation, in particular in the case where this nonlinear operation would correspond to a substitution table of relatively large size.

The masking step may advantageously be carried out either on the initial data blocks, before the step consisting in generating the intermediate data blocks, or on the intermediate data blocks.

In an embodiment of the present invention, the generating step comprises a decomposition operation (T) consisting in decomposing a data block of k bits into data blocks of j blocks (b, c) and the combining step comprises an inverse decomposition operation ($T^{-1}$) consisting in composing a data block of k bits (a') from the data blocks of j bits (B, C).

In an embodiment of the present invention, the cryptographic calculation furthermore includes at least one linear operation and the masked linear operation is performed before the decomposition operation T or after the inverse decomposition operation $T^{-1}$. In this case, when the encryption algorithm comprises linear operations before the nonlinear operation, the decomposition operation T is performed after the linear operations. When the encryption algorithm comprises linear operations after the nonlinear operation, the inverse decomposition operation $T^{-1}$ is performed before the linear operations.

In another embodiment, when the encryption algorithm includes linear operations, these masked linear operations are performed after the decomposition operation T and before the inverse decomposition operation $T^{-1}$. Thus, when an encryption algorithm is an algorithm with repetition of rounds, each of the rounds comprising at least one linear operation and at least one nonlinear operation, each round is performed after the decomposition operation T and before the decomposition operation $T^{-1}$.

It is also possible to apply the decomposition operation T at the start of the encryption algorithm and the inverse decomposition operation $T^{-1}$ at the end of the encryption algorithm. Thus, when such an algorithm is an encryption algorithm with repetition of rounds, all the operations of all the rounds of the algorithm are performed by manipulating blocks of strictly smaller size than the size of the initial data block.

FIG. 2 illustrates such an embodiment applied to an algorithm of AES type. Thus, a data block of size k to be encrypted 201 is decomposed by the decomposition operation T into several intermediate data blocks (202) to be encrypted of size j. The operations protected by masking 203, which are equivalent to those of the AES type algorithm that are specified for data blocks of size k, are then applied to the intermediate data blocks of size j. Encrypted intermediate data blocks 204 are obtained. Next, the inverse decomposition operation $T^{-1}$ is applied to obtain the encrypted data block 205 of size k. Such an embodiment therefore requires a modification of the operations of the algorithm so that they are applicable to the intermediate data blocks.

The step of generating the masked intermediate data blocks may comprise masked additions and masked multiplications which are carried out according to a masked multiplication algorithm taking masked data blocks of size j and a random mask as input and providing a masked product of the two unmasked data blocks.

The step of combining the intermediate data blocks and the modified data block may likewise comprise masked additions and masked multiplications which are carried out according to a masked multiplication algorithm taking masked data blocks of size j and a random mask as input and providing a masked product of the two unmasked data blocks.

As detailed in a following section, when the initial data block has a size of a byte and when the nonlinear operation specified can be implemented by means of a substitution table of size equal to 256 bytes, as in an AES type algorithm, it is advantageously possible to apply the nonlinear operation to an intermediate data block using a substitution table having a size of 8 bytes.

In an embodiment of the present invention, the nonlinear operation is bijective and, for the non null elements, is a multiplicative inversion in a finite field. Preferably, by convention, this operation maps the element 0 to the element 0.

In an embodiment of the present invention, the encryption algorithm, taking as input a message comprising a determined number of initial data blocks of size k, processes each of the initial data blocks sequentially. Thus, a substitution table is generated and stored for each initial data block and then each data block is processed one after the other.

In another embodiment of the present invention, the encryption algorithm processes all the data blocks of an input message simultaneously. Thus, the substitution tables are generated and stored simultaneously for each of the initial data blocks of the message, then said data blocks of the message are processed simultaneously. This type of simultaneous processing of blocks requires a memory area of larger size than the sequential processing of data blocks. In such a context, as detailed in a following section, it turns out to be very advantageous to reduce the substitution table corresponding to the nonlinear operation, as is proposed by the present invention.

In an embodiment of the present invention, an initial data block is processed using, each time the nonlinear operation of the encryption algorithm is carried out, a substitution table generated at the start of the encryption algorithm. Thus, the same substitution table is used throughout the processing of an initial data block by the encryption algorithm.

It is also possible to generate and store a substitution table before each masked nonlinear operation. In this embodiment, a new substitution table is used before each application of the nonlinear operation.

Such algorithms conventionally comprise several rounds each comprising linear operations and at least one nonlinear operation. The most frequent attacks of the execution of calculations in such algorithms are based on detections of information leakage during the execution of the first rounds and of the last rounds, since it is the rounds that manipulate data blocks close to the data blocks to be encrypted and encrypted data blocks. Thus, to protect such algorithms from these attacks, it is possible to mask the data blocks manipulated in the first round or rounds and/or in the last round or rounds. Consequently, it may be advantageous to generate and store substitution tables for at least the first round and at least the last round.

A second aspect of the present invention proposes an electronic component for executing a cryptographic calculation according to a determined cryptographic algorithm including at least one nonlinear operation specified on data blocks of k bits, k being an integer greater than 2, the component comprising, means for generating several masked blocks of j bits from an initial data block of k bits, j being an integer smaller than k;

means for applying a nonlinear operation to at least one of the masked blocks of j bits by means of a substitution table with $2^j$ entries producing a modified block of j bits;

means for combining the modified block of j bits and certain at least of said masked blocks of j bits into a result block of k bits corresponding to the initial data block of k bits through a transformation including said specified nonlinear operation.

By virtue of these provisions, it is possible to protect, from information leakage detection attacks, an electronic component employing an encryption algorithm of AES type comprising a nonlinear operation by manipulating masked data blocks and by using masked substitution tables of size equal to 8 bytes instead of masked substitution tables of size equal to 256 bytes.

Consequently, such a method of protecting an encryption algorithm requires a relatively small memory size. It may therefore be employed in electronic encryption components exhibiting a memory area of relatively small size.

Additionally, in an embodiment of the present invention, intermediate data blocks of size 4 bit are manipulated. Such a size allows efficacious implementation that is easier to carry out than when data blocks of lesser size are manipulated.

Other aspects, aims and advantages of the invention will become apparent on reading the description of one of its embodiments.

BRIEF DESCRIPTION OF THE DRAWINGS

The invention will also be better understood with the aid of the drawings, in which.

DETAILED DESCRIPTION

Figure 1:
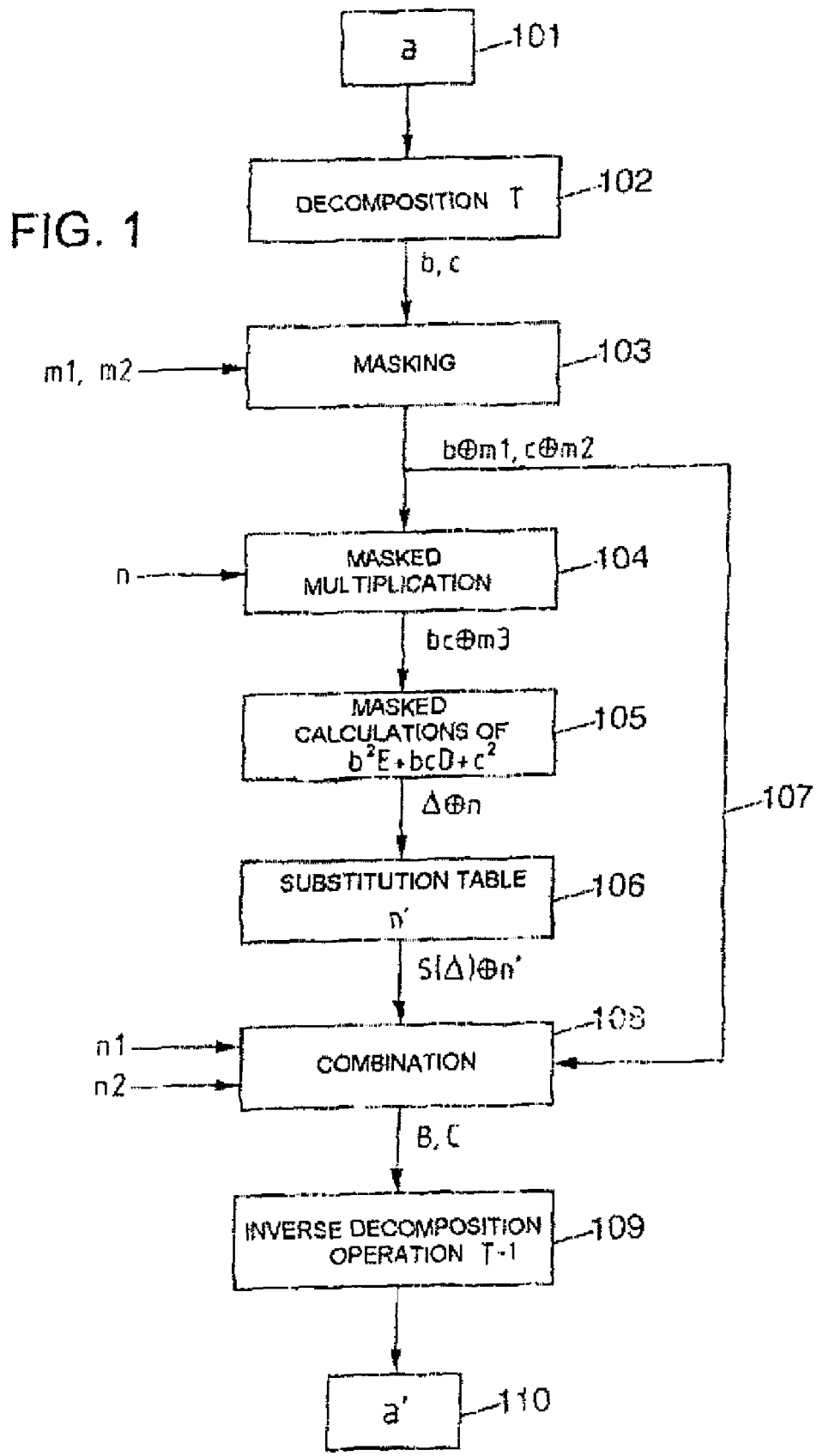
FIG. 1 illustrates a method of protecting an encryption algorithm according to an embodiment of the present invention.
Figure 2:
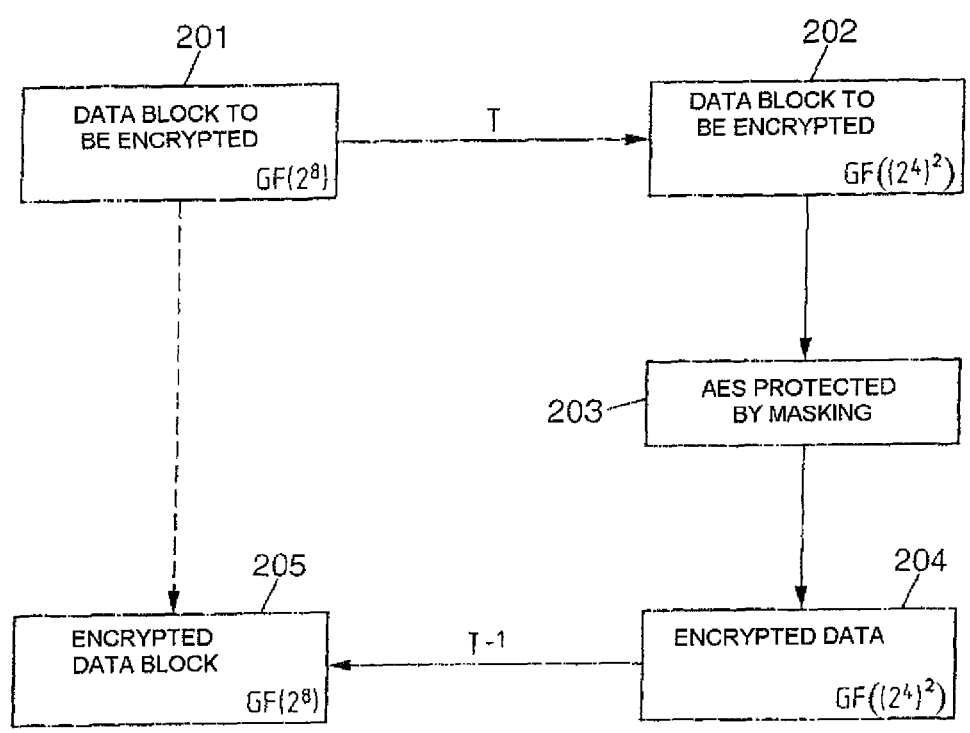
FIG. 2 illustrates a method of protecting an encryption algorithm of AES type according to an embodiment of the present invention.

In an embodiment of the present invention, use is made of well-known mathematical properties of finite fields (or Galois fields (GF)) so as to generate from an initial data block of size k several data blocks of size strictly less than k. An embodiment of the present invention is described for protecting by masking an encryption algorithm of AES type, taking as input a message composed of 16 bytes, each of the bytes being processed by a repetition of rounds each comprising a sequence of linear operations and at least one nonlinear operation. The invention covers other types of encryption algorithm comprising at least one nonlinear operation, whether or not there is repetition of rounds.

In an AES type algorithm, the nonlinear operation corresponds to a multiplicative inversion, for the non null elements, in the finite field $GF(2^8)$. Thus, to generate from a data block several intermediate data blocks of strictly smaller size, in an embodiment of the invention, it is proposed that the nonlinear operation be transposed from the field $GF(2^8)$ to the field $GF((2^4)^2)$.

The document by Tsing-Fu Ling, Chih-Pin Su, Chih-Tsun Huang, and Cheng-Wen Wu 'A high-throughput low-cost AES cipher chip', and also the document by Vincent Rijmen 'Efficient implementation of the Rijndael S-box' and the document by Atri Rudra, Pradeep K. Dubey, Charanjit S. Jutla, Vijay Kumar, Josyula R. Rao, and Pankaj rohatgi 'Efficient Rijndael Encryption Implementation with Composite Field Arithmetic' and then the document by R. W. Ward and T. C. A. Molteno 'Efficient hardware calculation of inversion in $GF(2^8)$' are known which show how the nonlinear operation of the AES algorithm can be transported into the compound field $GF((2^4)^2)$ and which show that such a transposition makes it possible to improve the performance of the encryption algorithm.

Conventionally, the AES therefore takes as input a message composed of 16 bytes. Several rounds are applied to each of these bytes, each round using a subkey derived from the main secret key. The AES generally comprises the following operations:

a nonlinear operation, conventionally referenced SubBytes, corresponding to a substitution table from 8 bits to 8 bits which is applied to each of the 16 bytes of the input message;

a linear exclusive or operation, conventionally referenced AddRoundKey, applied between the 16 bytes of the subkey and the 16 bytes of the input message;

a linear operation, conventionally referenced ShiftRows, corresponding to a permutation applied to the 16 bytes;

a linear operation, conventionally referenced mixed columns, applied to the 16 bytes.

The SubBytes operation of the AES algorithm comprises a nonlinear operation which corresponds, in the finite field $GF(2^8)$, for the non null elements, to a multiplicative inversion. Such an operation may be transported into the compound field $GF((2^4)^2)$, so that data blocks of size 4 bits are manipulated, before carrying out the inverse decomposition operation $T^{-1}$ for other operations manipulating bytes.

We choose a representation of $GF(2^4)$ and the field polynomial as follows:

$$P(x)=x^2+Dx+E;$$

D and E being elements of the finite field $GF(2^4)$)
So that we may write:

$$GF(2^8)=GF(2^4)[x]/P(x)$$

FIG. 1 illustrates an embodiment of the present invention.
We construct the decomposition operation T 102 which may be written:

$$T(a)=bx+c;$$

where a is an element of $GF(2^8)$
where (bx+c) is an element of $GF((2^4)^2)$, and b and c are elements of the finite field $GF(2^4)$).

This decomposition operation T generates from the data block a of size equal to one byte intermediate data blocks b and c of size equal to 4 bits.

This decomposition operation may be implemented in the form of a multiplication with an 8×8 matrix.

After this decomposition operation, the data blocks manipulated are intermediate data blocks of size 4 bits, strictly smaller than the size of the initial 8-bit block.

Such a decomposition operation T makes it possible to reduce the size of the data blocks manipulated in such a way as to be able to reduce the size of the substitution table corresponding to the first nonlinear operation. It is therefore carried out before performing the nonlinear operation. However, it may be carried out at various steps of the encryption algorithm. Thus, on each of the 16 bytes of the input message, this decomposition operation can be carried out either at the start of the algorithm, or at the start of each of the rounds of the algorithm, or else before each application of the nonlinear operation.

The present invention covers the embodiments wherever the algorithm step in which this decomposition operation is carried out.

Next, when the nonlinear operation using the substitution table has been performed, it is possible to carry out the inverse decomposition operation $T^{-1}$ to return to the finite field $GF(2^8)$ and again manipulate bytes.

The present invention covers the embodiments wherever the algorithm step in which the inverse decomposition operation is carried out.

According to the steps in which the decomposition operation T and the inverse decomposition operation $T^{-1}$ are carried out, other determined operations of the algorithm in $GF(2^8)$ are adapted to the finite field $GF((2^4)^2)$.

Thus, if the decomposition operation T is performed before the nonlinear operation and then if the inverse decomposition operation $T^{-1}$ is performed after the nonlinear operation, it is not necessary to adapt other operations of the algorithm to the finite field $GF((2^4)^2)$. On the other hand, in the case where the decomposition operation T is performed at the start of the algorithm and the inverse decomposition operation $T^{-1}$ at the end of the encryption algorithm, all the operations of the algorithm are adapted to the finite field $GF((2^4)^2)$. The operations of the encryption algorithm are then replaced by their equivalents in the finite field $GF((2^4)^2)$.

In an embodiment of the present invention, we mask 103 at least the intermediate data blocks manipulated at the time of the nonlinear operation for at least the first round and the last round of the AES algorithm, as detailed by the following sections. The invention also covers an embodiment in which the intermediate blocks manipulated at the time of the nonlinear operation are masked for all the rounds of the algorithm or else an embodiment in which all or part of the intermediate data blocks manipulated in the course of the execution of the algorithm axe masked, whether these data blocks are elements of $GF(2^8)$ or of $GF((2^4)^2)$.

In an embodiment of the present invention, the nonlinear operation is a multiplicative inversion in $GF(2^4)$ for the non null elements.

In the finite field $GF((2^4)^2)$, the inversion of an element (bx+c) may be written in the following form:

$$(bx+c)^{-1}=b\Delta^{-1}x+(c+bD)\Delta^{-1};$$

where $\Delta=b^2E+bcD+c^2$.

Thus, the first nonlinear operation of multiplicative inversion of the finite field $GF(2^8)$ transposed into the finite field $GF((2^4)^2)$, corresponds to multiplications, additions and the nonlinear operation of the multiplicative inversion. This nonlinear operation in the finite field $GF((2^4)^2)$ may be implemented through a 4-bit to 4-bit substitution table occupying 8 bytes.

As was described, one wishes to mask the data blocks thus manipulated. The masking of the additions is well known.

In order to mask the multiplications, a masked multiplication algorithm $M(x, y, z)$)104 is introduced. In what follows, the elements m1, m2, m3, n, n', n1, n2 are random masks. Such an algorithm takes as input:

masked elements of $GF(2^4)$, $(b \oplus m1)$ and $(c \oplus m2)$;
a mask m3,

Such an algorithm outputs the masked product in the form:

$$bc \oplus m3.$$

The following steps may be written:

$$u=(b \oplus m1)(c \oplus m2)=bc \oplus bm2 \oplus cm1 \oplus m1m2$$

$$v=(c \oplus m2)m1=cm1 \oplus m1m2$$

$$w=(b \oplus m1)m2=bm2 \oplus m1m2$$

$$M(b \oplus m1, c \oplus m2, m3)=u \oplus v \oplus w \oplus m1m2 \oplus$$

$$m3=bc \oplus m3.$$

In an embodiment of the present invention, the first intermediate data blocks are masked. One thus obtains a first masked decomposition which may be written in the following form:

$$(b \oplus m1)x+(c \oplus m2).$$

Next we use the masked multiplication algorithm to calculate the masked multiplication in the following form:

$$M(b \oplus m1, c \oplus m2, m3)=bc \oplus m3.$$

Next, in the same way, we calculate, according to step 105, the following products to obtain the masked data block Δ:

$$p=(bc \oplus m3)D=bcD \oplus m3D;$$

$$q=(b\oplus m1)^2E=b^2E\oplus m1^2E;$$

$$r=(c\oplus m2)^2=c^2\oplus m2^2.$$

Consequently we obtain the following equation:

$$p\oplus q\oplus r\oplus m1^2E\oplus m2^2\oplus m3D\oplus n=\Delta\oplus n.$$

Thus, in the finite field $GF(2^4)$ by addition and multiplication we obtain the masked data block, $\Delta\oplus n$, to which the nonlinear operation of multiplicative inversion is applied.

In an embodiment of the present invention, this nonlinear operation is carried out on the masked data block using a masked substitution table, tab[x], according to step 106, satisfying the following equation:

$$tab[x\oplus n]=x^{-1}\oplus n'.$$

This masked substitution table therefore makes it possible to obtain the inversion of the masked data block, i.e. $\Delta^{-1}\oplus n'$.

By applying the masked multiplication algorithm, we calculate:

$$-M(b\oplus m1,\Delta^{-1}\oplus n',n1)=b\Delta^{-1}\oplus n1=B;$$

$$-M(bD+c)\oplus(m1D+m2),\Delta^{-1}\oplus n',n2)=(bD+c)\cdot\Delta^{-1}\oplus n2=C.$$

Thus, by combining 108 the masked data blocks $b\oplus m1$, $c\oplus m2$ and $\Delta^{-1}\oplus n'$, we obtain $Bx+C$.

We therefore obtain a masked value of $(bx+c)^{-1}$ without having to manipulate, in order to carry out this nonlinear operation, the unmasked data blocks b, c and $\Delta$.

Next, the inverse decomposition operation $T^{-1}$ 109 is carried out to obtain an element 110:

$$a'T^{-1}(Bx+C).$$

In an embodiment of the present invention, D is determined equal to 1 so as to reduce the number of multiplications to be performed.

Advantageously, a nonlinear operation is therefore transposed from the finite field $GF(2^8)$ to the finite field $GF((2^4)^2)$ in which the nonlinear operation corresponds to a combination, of additions, of multiplications and of an equivalent nonlinear operation in a field having fewer elements.

Thus, it is possible to protect electronic components from attacks by detection of information leakage during the execution of a cryptographic calculation comprising a nonlinear operation by carrying out operations equivalent to this nonlinear operation on data blocks of reduced size, thereby making it possible to carry out these calculations on masked data blocks since the corresponding substitution table is of reduced size.

The invention claimed is:

1. A method for carrying out a cryptographic calculation in an electronic component, wherein a determined cryptographic calculation carried out in the electronic component includes at least one nonlinear operation specified on data blocks of k bits, k being an integer greater than 2, the method comprising the step of protecting the electronic component from attacks based on information leaked by the electronic component during execution of the cryptographic calculation by the electronic component, by:

generating, in the electronic component, several masked intermediate data blocks of j bits from an initial data block of k bits, j being an integer smaller than k;

computing, in the electronic component, a masked product of two intermediate data blocks of j bits by:

multiplying two masked intermediate data blocks of j bits, multiplying a first masked data block of j bits by a mask of a second masked data block of j bits, multiplying the second masked data block of j bits by a mask of the first masked data block of j bits, multiplying the mask of the first masked data block of j bits by the mask of the second masked data block of j bits, and masking the results of the four multiplications together with a mask to form a masked product, applying, in the electronic component, a nonlinear operation S specified on data blocks of j bits, corresponding to said nonlinear operation specified on data block of k bits, to at least one of the masked intermediate data blocks of j bits by means of a substitution table with $2^j$ entries producing a modified data block of j bits;

combining, in the electronic component, the modified data block of j bits and at least certain of said masked intermediate data blocks of j bits into a result block of k bits corresponding to the initial data block of k bits through a transformation including said nonlinear operation specified on data blocks of k bits.

2. The method as claimed in claim 1, wherein the initial data block of k bits is masked before the step consisting in generating the masked intermediate data blocks of j bits.

3. The method as claimed in claim 1, wherein the masked intermediate data blocks of j bits are masked before applying the nonlinear operation S.

4. The method as claimed in claim 1, wherein the generating step comprises a decomposition operation consisting in decomposing the initial data block of k bits into data blocks of j bits and the combining step comprises an inverse decomposition operation consisting in composing the result block of k bits from the data blocks of j bits.

5. The method as claimed in claim 4, wherein the cryptographic calculation furthermore includes at least one linear operation and wherein said at least one linear operation is performed before the decomposition operation or after the inverse decomposition operation.

6. The method as claimed in claim 4, wherein the cryptographic calculation furthermore includes a linear operation and wherein said linear operation is performed after the decomposition operation or before the inverse decomposition operation.

7. The method as claimed in claim 4, wherein the cryptographic calculation comprises a determined number of rounds and wherein the decomposition operation is applied at the generating step of a first round and the inverse decomposition operation after the combining step of a last round.

8. The method as claimed in claim 1, wherein the step of generating the masked intermediate data blocks of j bits comprises decomposing the initial data block of k bits into two unmasked data blocks and comprises masked additions and masked multiplications which are carried out according to a masked multiplication algorithm taking masked data blocks of size j of the two unmasked data blocks and a random mask as input and providing a masked product.

9. The method as claimed in claim 1, wherein the step of generating the masked intermediate data blocks of j bits comprises decomposing the initial data blocks of k bits into two unmasked data blocks and wherein the step of combining the masked intermediate data blocks of j bits and the modified data block of j bits comprises masked additions and masked multiplications which are carried out according to a masked multiplication algorithm taking masked data blocks of size j of the two unmasked data blocks and a random mask as input and providing a masked product.

10. The method as claimed in claim 1, wherein the initial data block of k bits and the result block of k bits has a size of a byte, the substitution table has a size of 8 bytes; and wherein the nonlinear operation S is bijective and, for the non null elements, is a multiplicative inversion in a finite field.

11. The method as claimed in claim 1, wherein the initial data block of k bits and the intermediate data blocks of j bits are masked by carrying out an exclusive or between the respective initial data block of k bits and the intermediate data blocks of j bits and a random mask.

12. The method as claimed in claim 1, wherein the cryptographic calculation takes as input a message comprising a determined number of the initial data block of k bits, and wherein, sequentially for each of the initial data block of k bits of said message, the substitution table is generated and stored and then said initial data block of k bits is processed.

13. The method as claimed in claim 12, wherein the cryptographic calculation comprises a determined number of rounds, and according to which the substitution table is generated and stored for at least a first round and at least a last round.

14. The method as claimed in claim 1, wherein the cryptographic calculation takes as input a message comprising a determined number of the initial data block of k bits and, wherein the substitution table is generated and stored simultaneously for each of the initial data block of k bits of the message, then the initial data block of k bits of the message are processed simultaneously.

15. The method as claimed in claim 12, wherein, the initial data block of k bits is encrypted each time the nonlinear operation S is carried out using the substitution table generated before generating the masked intermediate data blocks of j bits.

16. The method as claimed in claim 12, wherein the substitution table is generated before each masked nonlinear operation.

17. The method as claimed in claim 1, wherein the cryptographic calculation is performed according to the AES.

18. An electronic component arranged to carry out a cryptographic calculation according to a determined cryptographic algorithm including at least one nonlinear operation specified on data blocks of k bits, k being an integer greater than 2, the electronic component comprising:

means for generating several masked blocks of j bits from an initial data block of k bits, j being an integer smaller than k;

means for computing a masked product of two intermediate data blocks of j bits by:
  multiplying two masked intermediate data blocks of j bits,
  multiplying a first masked data block of j bits by a mask of a second masked data block of j bits,
  multiplying the second masked data block of j bits by a mask of the first masked data block of j bits,
  multiplying the mask of the first masked data block of j bits by the mask of the second masked data block of j bits, and
  masking results of the four multiplications together with a mask to form a masked product, means for applying a nonlinear operation S specified on data blocks of j bits, corresponding to said nonlinear operation specified on data blocks of k bits, to at least one of the masked blocks of j bits by means of a substitution table with entries producing a modified block of j bits;

means for combining the modified block of j bits and at least certain of said masked blocks of j bits into a result block of k bits corresponding to the initial data block of k bits through a transformation including said nonlinear operation specified on the initial data blocks of k bits, the electronic component being arranged to protect itself from attacks based on information leaked by the electronic component during execution of the cryptographic calculation by the electronic component, with the above means for masking, means for computing a product, means for applying a nonlinear operation S, and means for combining.

19. The electronic component as claimed in claim 18, wherein the cryptographic calculation is performed according to the AES.

* * * * *